July 21, 1959 H. PANDE 2,895,644
PROPORTIONING APPARATUS
Filed Oct. 18, 1956 3 Sheets-Sheet 1
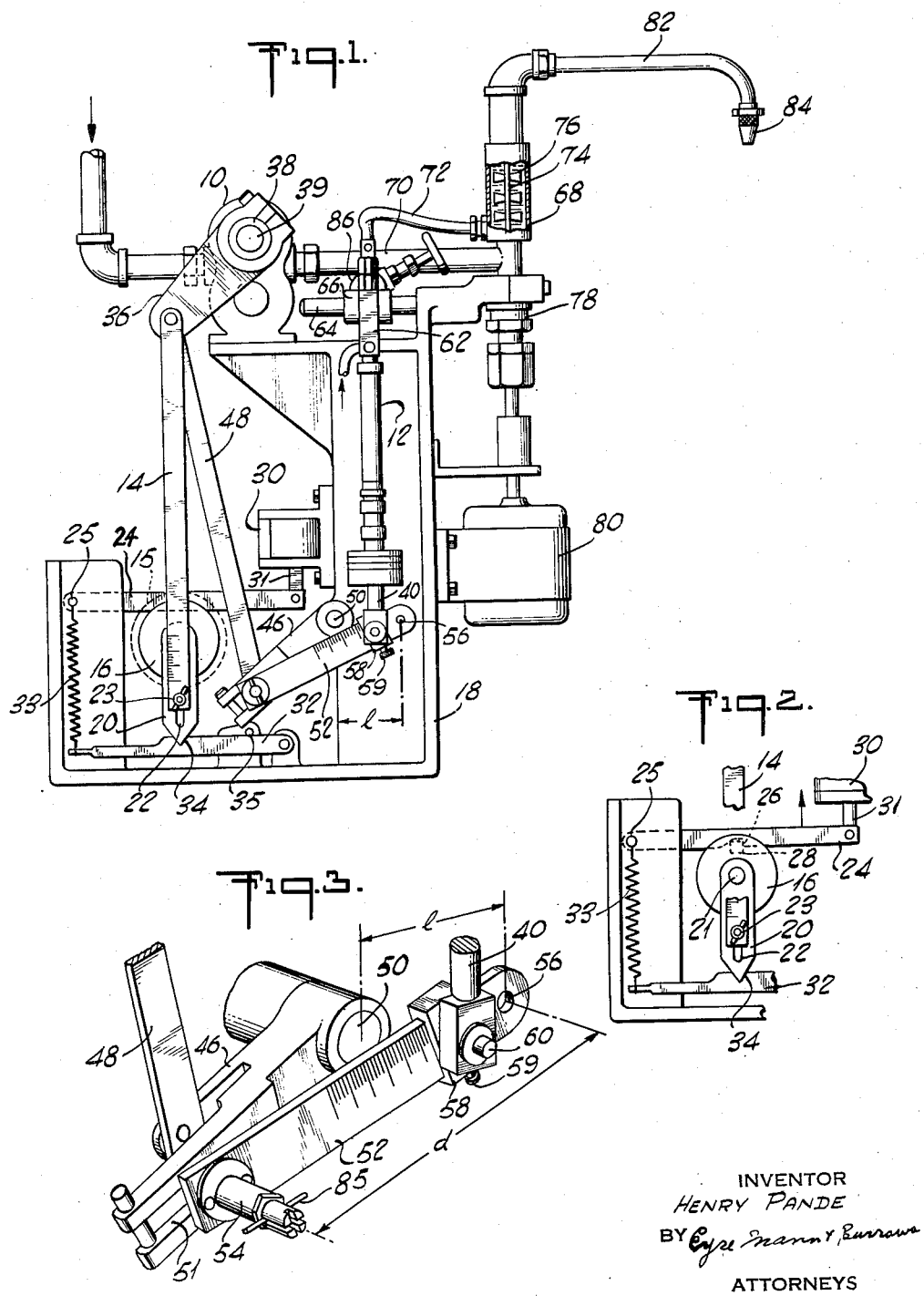
INVENTOR
HENRY PANDE
BY
ATTORNEYS July 21, 1959 H. PANDE 2,895,644
PROPORTIONING APPARATUS
Filed Oct. 18, 1956 3 Sheets-Sheet 2

INVENTOR
HENRY PANDE
BY
Eyre Mann & Burrows
ATTORNEYS

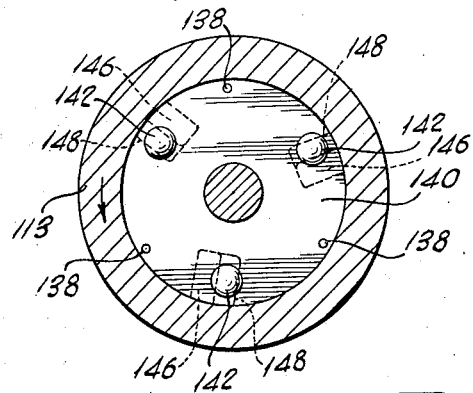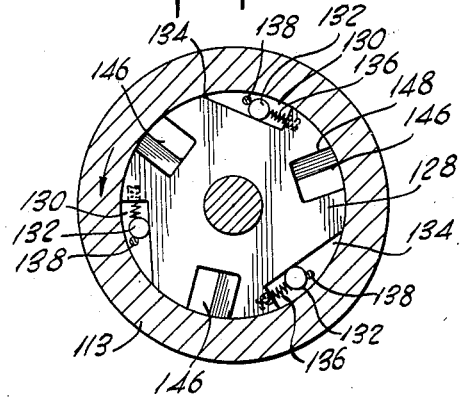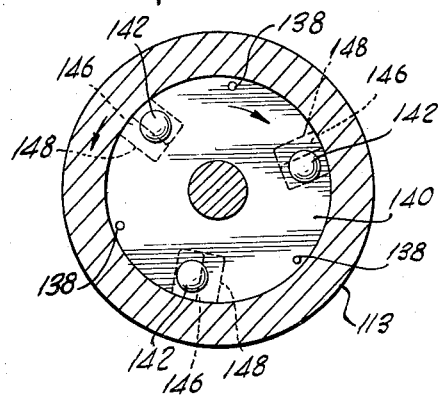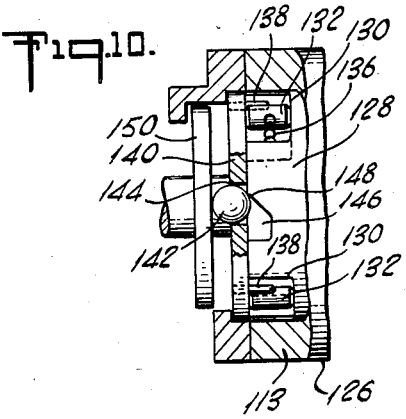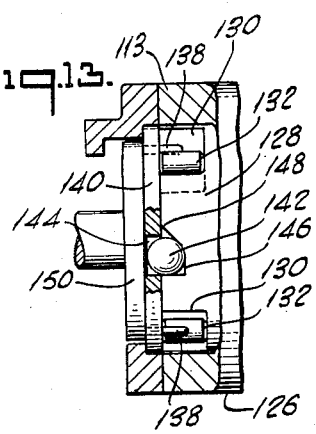

United States Patent Office 2,895,644
Patented July 21, 1959

---

2,895,644

PROPORTIONING APPARATUS

Henry Pande, East Orange, N.J., assignor to H. V. Hardman Co., Incorporated, a corporation of New Jersey Application October 18, 1956, Serial No. 616,637

21 Claims. (Cl. 222—134)

This invention relates to apparatus which mixes two liquids in proportion and delivers measured quantities of the resulting mixture in intermittent flow.

In accordance with the present invention the pumps for the liquids are driven by means of a reciprocating drive which so synchronizes pumping action that simultaneous pumping of liquids in intermittent flow is achieved. With this construction a change in the magnitude of the reciprocating action of the drive results in changing the quantity of liquid delivered without change in proportion and the proportion of each liquid in the mixture may be changed by changing the point of connection of one of the pumps on the reciprocating drive. With a reciprocating drive rotary pumps may be combined with reciprocating pumps, and this is of particular advantage in those cases where it is desirable to mix a highly fluid liquid with a viscous liquid as in combining an aliphatic amine catalyst with an epoxy base resin. The proportioning apparatus of the present invention is particularly useful in connection with so-called potting compounds in which a certain proportion of a liquid catalyst is mixed with a base resin and the liquid mixture is then intermittently measured out into small containers.

The structure of the present invention can be readily undrestood by reference to the accompanying drawings, in which Fig. 1 is a front plan view of the proportioning apparatus;

Fig. 2 is a front plan view of a single revolution clutch for the reciprocating drive of the apparatus of Fig. 1 broken away in part to better illustrate its operation;

Fig. 3 is an enlarged isometric view illustrating a preferred drive for the reciprocating pump of Fig. 1;

Figs. 9 through 13 illustrate operation of the solenoid control of Fig. 7.

Figure 5:
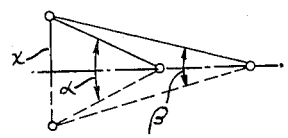
Fig. 5 is a diagram showing the angular displacement of a pair of arms of the reciprocating drive of Fig. 1.

Turning now to the drawings, the proportioning apparatus of the present invention includes a rotary pump 10 and a reciprocating pump 12 driven by means of a reciprocating arm 14 which is in turn driven by means of a suitable source of power such as an electric motor (15) through a single revolution clutch 16. For convenience of operation the apparatus is mounted in a framework 18. Single revolutions clutch 16 which carries a slotted arm 20 is mounted on the shaft 21 of electric motor 15 and reciprocating arm 14 is pivotally mounted in the slot 22 of arm 20 by means of bolt 23.

The pivotal point of reciprocating arm 14 in slot 22 is off center from the shaft 21 of motor 15 and as a result each time clutch 16 is actuated to make a single revolution, reciprocating arm 14 will move up (Fig. 1) and then back down into its initial starting position.

Single-revolution clutch 16 is a standard type clutch readily available on the open market and as shown in Fig. 2, operation of the clutch is controlled by means of a lever arm 24 which is pivotally mounted at its base in framework 18 as indicated at 25. Arm 24 has a stop shoulder 26 that is adapted to cam a key 28 away from the driving member (not shown) of the clutch which is keyed to shaft 21 of motor 15. When arm 24 is lifted up away from clutch member 16 a spring forces key 28 to move into engagement with the driving member and as a result the clutch is engaged and arm 20 rotates until stop shoulder 26 again contacts key 28 and cams it out of engagement with the driving member of the clutch. Automatic operation of clutch 16 is achieved by means of solenoid 30 which has its plunger 31 attached to arm 24 and as a result when the solenoid is actuated, piston 31 will raise arm 24 lifting it up away from clutch 16. Solenoid 30 is automatically deactivated after clutch 16 is engaged so that gravity will automatically force arm 24 down against the clutch so that stop shoulder 26 will engage and cam key 28 out away from the driving member of the clutch which is thereby disengaged at the end of a single revolution.

In order to insure accuracy of pumping so that the same amount of liquid will be delivered for each revolution of clutch 16, an arm 32 pivotally mounted in framework 18 is tensioned up against the bottom end of arm (20) by means of a spring 33. Arm 32 is provided with a notch 34 which fits over the end of arm 20 and as a result of the tension of spring 33, the notch serves as a stop to prevent clutch 16 from drifting. With this construction, reciprocating arm (14) is returned to the identical position from which it started out which insures delivery of the same amount of liquid for each revolution of clutch 16. A pin 35 positioned above arm 32 serves as a stop to limit upward movement of the arm.

Referring to reciprocating arm 14, one end of arm 14 is pivotally mounted in slot 22 of arm 20 and the other end of the arm is pivotally mounted on an arm 36 that drives the driving member 38 of a so-called overrunning type clutch (not shown) which is in turn mounted on drive-shaft 39 of rotary pump 10. The overrunning clutch is a conventional unit that operates like an ordinary ratchet with infinite number of teeth so that when arm 36 is driven clockwise (up) in Fig. 1, the driving member 38 of the clutch drives shaft 39 of rotary pump 10. When arm 36 moves counterclockwise, (down) driving member 38 runs free on shaft 39. Further details of operation of overrunning clutch will be described below in connection with Figs. 7 through 13. Arm 36 is so mounted on driving member 38 that its pivotal point is positioned on the line of the longitudinal axis of shaft 39.

With this construction, rotation of the impellers (not shown) of rotary pump 10 is controlled by movement of arm 36 and each time single-revolution clutch 16 is actuated, shaft 39 of pump 10 is made to rotate a certain amount and as a result pump 10 is made to pump a certain amount of liquid. The angle through which the impellers of pump 10 are made to move each time single-revolution clutch 16 is actuated is equal to an angle α (see Fig. 5) which is the angle that arm 36 makes in pivoting about its pivotal point on the longitudinal axis of shaft 39. Since the vertical displacement of arm 36 for a limited portion of the arc of arm 36 is in direct proportion to angle α it is possible to transmit reciprocating movement of arm 36 to piston 40 of pump 12 and thereby achieve a quantity of liquid from piston pump 12 that is in direct proportion to the quantity of liquid delivered by rotary pump 10, regardless of changes in the quantity of liquid delivered by pump 10.

Figure 4:
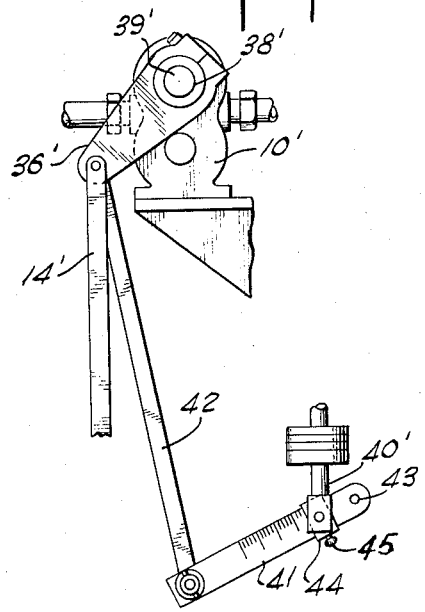
Fig. 4 illustrates another form of drive for the reciprocating pump of Fig. 1.

This arrangement is shown schematically in Fig. 4 wherein rotary pump 10' corresponds to rotary pump 10, driving member 38' of the overrunning clutch (not shown) corresponds to driving member 38 of the clutch of Fig. 1 and the reciprocating arm 14' corresponds to reciprocating arm 14. As in the case of the form of my invention shown in Fig. 1, arm 14' is connected to driving member 38' of the overrunning clutch by means of a pivotal arm 36' and the pivotal point of the arm coincides with the line of the longitudinal axis of shaft 39' of rotary pump 10'. Piston 40' of a piston pump (not shown) may be connected directly to arm 36' but for convenience of arrangement of parts the movement of arm 36' is transmitted to a second pivotal arm 41 by means of a connecting lever 42. Preferably the length of pivotal arm 41 between its pivotal point 43 and point of connection with lever 42 is equal to the length of arm 36' between its pivotal point on the longitudinal axis of shaft 39' and its point of connection to lever 42. As a result arm 41 will move through the same angle α made by arm 36' for each revolution of clutch 16. Piston 40' is pivotally mounted on a bracket 44 which is in turn slidably mounted on arm 41. Bracket 44 is held in place on arm 41 by means of a set screw 45. With this construction arm 41 will move through the same angle α of arm 36' each time clutch 16 is actuated and the vertical displacement of piston 40' will be proportional to the vertical displacement ($X$) of angle α (see Fig. 5). If the operation of reciprocating arm 14' is such that the angle which arm 36' makes each time arm 14' moves up (Fig. 2) and then back down into its starting position is 15° then the piston pump of piston 40' will deliver a quantity of liquid that is within about 1.0% of being in direct proportion to the quantity of liquid delivered by rotary pump 10'. As this 15° angle of arm 36' is decreased, the percentage of error decreases below 1% and as the angle increases, the percentage of error increases. At 60° the error is about 4.8% and when the angle α of arm 36' reaches 90° the error is about 10%. It will be understood that the percentages of error set forth above are based on theoretical calculations and the efficiency of the pumps and other equipment has not been included in such calculations. The structure shown in Fig. 4 is satisfactory for most applications where the angle α of arm 36' is small but where it is desirable to operate with a large angle the percent of error may be beyond allowable limits.

As shown in Fig. 1, pivotal arm 36 is connected with a second pivotal arm 46 by means of a connecting link 48 which is pivotally connected at each end of arms 36 and 46 respectively. Arm 46 is pivotally mounted in framework 18 at 50 and the arm has a slot 51 in which a third pivotal arm 52 is slidably mounted as at 54. (See Fig. 3.) The third pivotal arm 52 is pivotally mounted in framework 18 at 56 and piston 40 of pump 12 is slidably mounted on arm 52 by means of a slide 58. Slide 58 is held in place on the arm by means of a set screw 59 and piston 40 is in turn pivotally mounted on slide 58 as at 60. Since arm 52 is free to slide in slot 51 of arm 46 and since the length of arm 52 between its pivotal point 56 and its point of sliding attachment to arm 46 is greater than the corresponding length of arm 46 between its pivotal point 50 and point of attachment to arm 52, arm 52 will move through an angle β (see Fig. 5) each time single revolution clutch 16 is actuated and the angle β will be smaller than angle α.

With this construction the error incident to operation with a large angle α for the structure of Fig. 4 is corrected and the quantity of liquid delivered by piston pump 12 is in direct proportion to the quantity of liquid delivered by rotary pump 10, regardless of the size of angle α and such proportional relationship is maintained regardless of changes in the quantity of liquid delivered by rotary pump 10. The extent of correction of error for large angles depends upon the distance ($l$) which is the horizontal distance between pivotal point 56 of arm 52 and pivotal point 50 of arm 46 and the correction of error also depends upon the length ($d$) of arm 52 between its pivotal point 56 and point of sliding contact 54 in the slot of arm 46.

In the preferred form of structure shown in Fig. 1, angle α is set for about 120° (60° on each side of a horizontal plane through the longitudinal axis of shaft 39). The horizontal distance ($d$) between points 56 and 54 of arm 52 is about 5 inches (Fig. 3) and ($l$) is about 1.9 inches. The vertical displacement of arm 52 is in direct proportion to the size of angle α and the quantity of liquid delivered by pump 12 is in direct proportion to the quantity of liquid delivered by rotary pump 10, regardless of changes in angle α. In this connection, it will be noted that with the structure of Fig. 4 the percent error in proportion to the quantity of liquid delivered by the piston pump (not shown) for changes in the quantity of liquid delivered by rotary pump 10' is about 1% for an angle α of 15° and about 17% for an angle α of about 120°, whereas with the structure shown in Fig. 1 the quantities of the two liquids are substantially in direct proportion for an angle α of 120° or 15°. In some cases there may be a small error in the quantities of liquid pumped by the structure of Fig. 1. This is caused by differences in efficiency of the pumps at a small and large angle α and although this can be taken care of by changing the distance ($l$) the error is so small that as a practical matter it may be ignored. It will be understood that the specific examples and calculations given hereinabove are merely given to illustrate the principle of operation of the structure of my invention, and such examples and calculations are not to be taken as a limitation of the disclosed invention.

As to pumps, rotary pump 10 is a conventional type of gear pump which, as is known, is particularly advantageous for pumping viscous liquids. Other standard type of rotary pump may be used and for best results a pump having a relatively small amount of slippage is employed. Reciprocating pump 12 is also of conventional construction and any reciprocating type pump may be used, such as a bellows or diaphragm pump. It is shown as an ordinary piston pump having a conventional double ball valve head 62. Piston pump 12 is slidably mounted on a rod 64 by means of a slide 66 so that the position of the pump may be changed according to the position of slide 58 on arm 52 to maintain the piston pump in vertical position which is necessary for the accurate pumping of liquid. Liquid is piped to the pumps in conventional manner from a suitable source of supply and as previously described hereinabove, pumping and delivery of proportionate quantities of liquid is in the form of intermittent flow since delivery of liquid only takes place when arm 36 is moved in clockwise direction in Fig. 1, and no delivery of liquid takes place when arm 36 moves in a counterclockwise direction.

Up until now the description of my invention has been directed to the structure whereby a rotary pump and a piston pump are driven by means of a single source of power to deliver proportionate quantities of two liquids in intermittent flow. The preferred way in which these two liquids are mixed and the way in which the mixture is delivered for use will now be described.

This is done by means of mixing chamber 68. Liquid from rotary pump 10 is piped into the bottom of mixing chamber 68 by means of pipe 70, and liquid from piston pump 12 is also piped into the bottom of mixing chamber 66 by means of pipe 72. In order to thoroughly mix the two liquids I also provide chamber 68 with an agitator which includes a shaft 74 having small paddles 76 positioned thereon. The agitator shaft 74 is rotatively mounted in a bearing 78 in the bottom of chamber 68 and the bearing is adapted to form a liquid-tight seal with shaft 74. The shaft is rotated to agitate the liquid in chamber 68 by means of an electric motor 80. It is to be noted that pipe 72 feeds into mixing chamber 68 above the point of feed of pipe 70 so that liquid catalyst delivered by pump 12 will be carried upwardly away from the seal of shaft 74. As a result there is no tendency for resin to cure and set up in the seal which might otherwise interfere with rotation of shaft 74. It will also be noted that since the liquid is discharged from the top of chamber 68 and since the liquid in chamber 68 surrounding the seal of shaft 74 is at a pressure greater than atmospheric pressure, there is no tendency for bubbles of air to enter the mixing chamber. This is important because if bubbles get into the liquid in chamber 68 they may interfere with delivery of liquid and smooth operation of the apparatus and undesirable air bubbles may appear in the cured resin. A gooseneck tube 82 screwed into the top of mixing chamber 68 delivers the liquid mixture to the desired point through a nozzle 84. In order to get a sharp cutoff when the flow of liquid is interrupted, I have found it desirable to so position nozzle 84 that the vertical distance between the top of gooseneck 82 and the discharge point of the nozzle will be as small as it possibly can be and certainly the discharge point of nozzle 84 will be above the level where the two liquids are delivered into mixing chamber 68.

At the start of operations, piston pump 12 is disconnected so that it will not pump liquid such as a resin catalyst until chamber 68 has been filled with base resin. This is done by releasing the spring loaded pin 85 which slidably connects arm 52 to the slot of arm 46. Motor 15 is then started up and lever arm 24 is pivoted up away from single revolution clutch 16 by means of solenoid 30 and the arm is held out of contact with clutch 16 until chamber 68 is filled with base resin. A check valve (not shown) may be positioned in pipe 72 to prevent base resin from entering this pipe. After chamber 68 is filled with base resin arm 52 is again connected to arm 46 and pumping is continued until catalized resin appears at nozzle 84. Arm 24 is then released whereupon it drops down against clutch 16 to disengage the clutch. Of course motor 80 is started up to agitate the base resin before catalyst is pumped into chamber 68. In order to deliver a measured quantity of the liquid mixture at nozzle 84, lever arm 24 is merely pivoted away from the surface of clutch 16 and then released. As a result, clutch 16 will drive arm 20 through a single revolution and, as previously described above, rotary pump 10 and piston pump 12 are thereby actuated to deliver proportionate quantities of liquid to mixing chamber 68. The exact proportion in which the two liquids are delivered is determined by the position of slide 58 on arm 52. By moving slide 58 away from the pivotal point 56 of arm 52 the quantity of liquid delivered by piston pump 12 is increased and by moving slide 58 towards pivotal point 56 the quantity of liquid delivered by piston pump 12 is decreased. Piston pump 12 shown is adapted to deliver about 1 part of liquid for about 10 parts of liquid delivered by rotary pump 10. Of course, these proportions may be readily changed at will by changing the position of slide 58 on arm 52 to change the stroke of piston pump 12.

In order to change the quantity of liquid delivered by rotary pump 10 it is only necessary to change the position of bolt 23 in slot 22 of arm 20. By moving bolt 23 away from the shaft 21 of motor 15 the quantity of liquid delivered by rotary pump 10 is increased and by moving bolt 23 in towards the center of the shaft the quantity of liquid delivered by rotary pump 10 is decreased. In this connection it is to be noted that any change in the position of bolt 23 not only changes the quantity of liquid delivered by the impellers (not shown) of rotary pump 10 but it also changes the displacement of arm 52, so that the quantity of liquid delivered by piston pump 12 is also changed. If the position of slide 58 on arm 52 remains the same when bolt 23 is moved, then piston pump 12 will continue to deliver the liquid in the same proportion to the liquid delivered by rotary pump 10, regardless of changes in the quantity of liquid delivered by rotary pump 10.

The equipment shown in the drawings is particularly useful in mixing a catalyst with a synthetic resin to set and cure the resin. For example, I may employ an epoxy resin which may be a very viscous material having a viscosity of the order of about 10,000 to 100,000 centipoises at 25° C. Such a viscous material requires a gear pump for pumping it at room temperatures. On the other hand, the amine catalyst required for curing the base resin is a highly fluid liquid very similar to water and as such it requires a piston for the delivery of measured quantities of the liquid catalyst. Ordinarily about 1 part of catalyst is required for about 3 to 16 parts of the base resin. The exact ratio of catalyst to resin is determined by the type of base resin and catalyst employed. As soon as the amine catalyst and base resin are mixed the mixture starts to cure and harden and in some cases the liquid will solidify in a matter of 15 or 20 minutes. The proportion of base resin to catalyst is an important consideration and it determines curing time, temperature of cure, viscosity of liquid catalyzed resin and physical characteristics of the cured resin. These considerations are particularly important in potting operations and in the setting of bristles in the ferrule of a paint brush. In these operations it is also important to deliver a set measured amount of liquid resin in separate shots and to have a sharp cutoff of the flow of liquid between shots. My proportioning apparatus is excellent for this purpose in that the catalyst may be mixed with the base resin in any desired proportion and such proportional relationship will be maintained regardless of changes in the amount of catalyzed resin delivered to nozzle 84.

The mixing chamber may be readily drained by opening a valve 86 in base resin pipe 70 and if desired the system may be flushed out with a suitable solvent without taking it apart. If the apparatus is to stand idle, the catalyzed resin mixture in chamber 74 may be purged out with base resin. This is done by releasing spring loaded pin 85 to disconnect arm 52 from pivotal arm 46 so that piston 12 will remain idle while rotary pump 10 continues to pump base resin to chamber 68. Once the catalyzed resin is removed from chamber 68 the base resin alone will not set up and harden and it may remain in chamber 68.

While the proportioning apparatus of Fig. 1 has in practice given excellent results with a highly fluid liquid catalyst such as the aliphatic amine catalysts, it is not entirely satisfactory for viscous catalysts because the reciprocating pump will not at ordinary temperatures deliver the same amount of liquid for each revoltuion of clutch 16. The form of invention illustrated in Figs. 6 through 13 is particularly useful for pumping highly viscous catalysts. The proportioning apparatus of Figs. 6 through 13 is identical with that of Fig. 1 with the exception that piston pump 12 has been replaced with a rotary pump 92. Since the apparatus of Figs. 6 through 13 is identical with that of Fig. 1 with the exception of the second rotary pump 92 the apparatus is schematically illustrated and only those parts which are necessary for replacing piston pump 12 with rotary pump 92 are shown.

Figure 6:
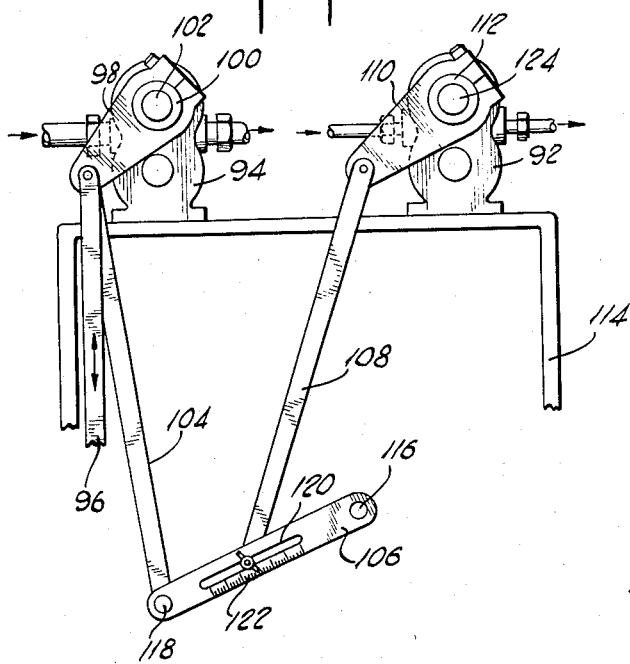
Fig. 6 illustrates another form of the apparatus of Fig. 1.

Turning now to Fig. 6 rotary pump 94 which corresponds to rotary pump 10 is driven by means of a reciprocating arm 96 (14) which drives the pivotal arm 98 (36) which in turn drives the driving member 100 (38) of an overrunning clutch (not shown) mounted on shaft 102 (39) of rotary pump 94. The drive for reciprocating arm 96 is identical with that described in connection with the apparatus of Fig. 1. When the reciprocating arm moves up pump (94) delivers liquid and when the reciprocating arm moves down (Fig. 6) the overrunning clutch runs free of the shaft of pump 94 and no liquid is delivered.

Figure 7:
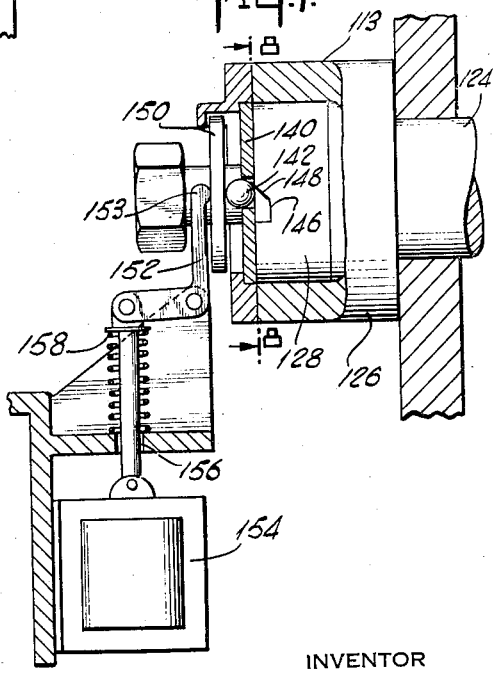
Fig. 7 illustrates a solenoid control for disengaging the overrunning clutch member for one of the rotary pumps of Fig. 6.

The second rotary pump 92 is connected to arm 96 by means of a connecting link 104, pivotal arm 106, connecting link 108 and pivotal arm 110 which supplies power to pump 92 through the driving member 112 of an overrunning clutch 113 (see Fig. 7). It will be noted that the use of a second rotary pump in place of a reciprocating pump greatly simplifies the mechanical linkage required for connecting the second rotary pump to the reciprocating arm drive because liquid delivered by the second rotary pump is within less than 1% of being in direct proportion to the arc of arm 98 and it is not related to the cord of the arc (vertical displacement) as in the case of the reciprocating pump 12. Again referring to the mechanical linkage for rotary pump 92, connecting link 104 is pivotally connected at each end to arm 96 and 106 respectively. Arm 106 is pivotally mounted in framework 114 at 116 and the length of the arm between its pivotal point 116 and the pivotal point 118 where arm 106 is connected to link 104 may be made equal to the length of arm 98 between its pivotal point on shaft 102 of pump 94 and the pivotal point where arm 98 is connected to driving arm 96. As a result, the arc through which arm 106 moves will be the same as the arc through which arm 98 moves for each revolution of the single revolution driving clutch (not shown). Arm 106 has a slot 120 which slidably mounts one end of connecting link 108 by means of a sliding pin 122 on which link 108 pivots. The second end of the connecting link 108 is pivotally mounted on arm 110 which drives the driving member 112 of the overrunning clutch 113 mounted on shaft 124 of pump 92. The length of arm 110 between its pivotal point on shaft 124 of clutch 113 and the pivotal point of attachment of link 108 is preferably made equal to the length of arm 98 between its pivotal point on shaft 102 and the pivotal point where arm 98 is connected to driving arm 96. With this construction, pump 92 will deliver liquid that is within 1% of being in direct proportion to the liquid delivered by pump 94 and the ratio between the quantity of liquid delivered by each pump will be determined by the position of link 108 in slot 120 of arm 106. The position of link 108 in slot 120 may be changed by changing the position of pin 122 in the slot.

It will now be understood that except for the connection of rotary pump 92 to arm 98, the structure and operation of this form of my invention is identical with the structure disclosed in Fig. 1. Liquid is piped to the suction side of the two pumps in a conventional way from a suitable source of supply and pumps 92 and 94 deliver liquid into a mixing chamber as previously described in connection with the form of invention shown in Fig. 1.

At the end of a run it may be desirable to clean out the mixing chamber by just pumping base resin without catalyst through the chamber. This may be done by disengaging overrunning clutch 113. Overrunning clutch 113 is illustrated in Figs. 7 through 13 and as there shown the clutch comprises a housing 126 which rotates on a driven member 128 under the influence of pivotal arm 110. Driven member 128 is keyed to pump shaft 124 and member 128 is provided with a plurality of notches 130 (Fig. 8) in the general form of a triangle which are cut into the side of the member at its circumference. The notches, in this case three, are evenly distributed 120° apart around the circumference of driven member 128. A steel roller 132 is positioned in each triangular notch and the size of the steel roller is such that when the roller is positioned at the base of the notch away from the apex 134 of the triangular notch, the roller does not touch housing 126 which may then rotate free of driven member 128 and shaft 124. On the other hand when the rollers 132 are positioned away from the base of notch 130 up near the apex 134, the rollers are in contact with both driven member 128 and the inside of housing 126. In this case when housing 126 moves counter-clockwise in Fig. 8 (clockwise in Fig. 6) member 128 and shaft 124 turn in a counterclockwise direction (Fig. 8) and pump 112 delivers liquid. Springs 136 mounted behind each roller constantly urge the rollers up toward the apex 134 of the triangular notch to engage the clutch. Movement of housing 126 in clockwise direction (Fig. 8) causes the rollers to roll away from the apex compressing the springs whereupon housing 126 rotates in clockwise (Fig. 8) direction free of member 128 and shaft 124. It is to be noted that the action of overrunning clutch 113 is very much like that of an ordinary ratchet clutch. The clutch as described above is a conventional unit.

In accordance with the present invention a pin 138 is positioned between each roller 132 and the apex 134 of the triangular notch and pins 138 are small enough so that they may be positioned between the roller and apex 134 without interfering with clutch engagement. Pins 138 are mounted in a clutch disengaging plate 140 which is in turn rotatively mounted in housing 126 next to clutch plate 128 (Fig. 7). When the clutch is engaged rollers 132 under the action of springs 136 hold pins 138 in the position shown in Figs. 9 and 10. To disengage the clutch plate pins 138 are moved in a clockwise direction Figs. 12 and 13 against the force of springs 136 so that rollers 132 move down towards the base of notches 130 to disengage clutch 112.

Figure 8:
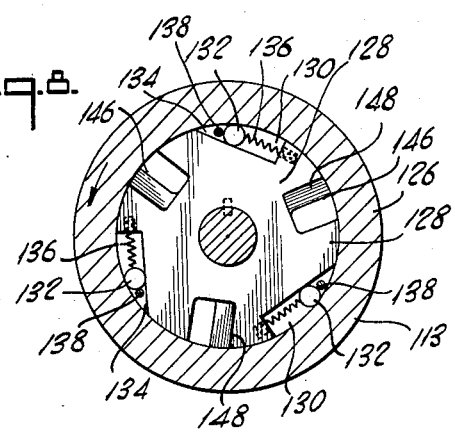
Fig. 8 is taken on line 8—8 of Fig. 7.

Movement of pins 138 in a clockwise direction (Fig. 8) is achieved by means of steel balls 142 each of which is mounted in a hole 144 in plate 140. Holes 144 are large enough so that the balls may move up and down in the holes see Figs. 10 and 13 and each ball is positioned in a groove 146 cut in the face of driven member 128 along a radial line emanating out from the center of shaft 124. Grooves 146 are generally wedge-shaped so that the grooves serve as a cam surface and the shallow end 148 of the wedge-shaped cam is positioned at the leading edge of the groove when driven member 128 is rotated in a counter clockwise direction (Figs. 8, 9 and 10). When the clutch is engaged balls 142 are positioned at the shallow end 148 of the wedge-shaped cam. To disengage the clutch a plate 150 is forced against balls 142 which under the influence of the cam surface of grooves 146 move into the deep end of the grooves and thereby cause plate 140 to move clockwise (Fig. 8) relative to member 128 (see Figs. 11, 12 and 13). As a result of the clockwise movement of plate 140 pins 138 move clockwise opposite to the counter clockwise rotation of housing 126 (Fig. 8) and force rollers 132 into the base of the triangular notches 130. As a result member 128 and shaft 124 are disengaged from housing 126 which continues to move in counter clockwise direction (Fig. 11) free of member 128 and shaft 124. When the pressure of plate 150 is released springs 136 again move rollers 132 up towards the apex 134 of notches 130 to engage the driven member 128 with housing 126 and the force of springs 136 move pins 138, balls 146 and plate 140 back into the position shown in Figs. 9 and 10.

As most clearly shown in Fig. 7 plate 150 is slidably mounted in housing 126 of clutch 113 and the position of plate 150 is controlled by means of a forked pivotal arm 152. The forked end 153 of pivotal arm 152 bears against plate 150 and the second end of the arm is connected to a solenoid 154 by means of a link 156. A spring 158 exerts a continuous force against pivotal arm 152 urging the arm in against plate 150 and the force of spring 158 is sufficient to force balls 142 down into grooves 146 to disengage clutch 113 (Figs. 11, 12 and 13). The clutch is engaged by energizing solenoid 154 which pulls link 156 down toward the solenoid (Fig. 7) to overcome the force of spring 158 and release plate 150 so that balls 142 may move into position at the shallow end 148 of grooves 146 as shown in Figs. 8, 9 and 10. With this construction clutch 113 is disengaged by deactivating solenoid 154 whereupon spring 158 will force plate 150 against balls 142 and disengage the clutch, as previously described hereinabove. When this is done pump 92 is idle but pump 94 will continue to deliver base resin to the mixing chamber until the chamber is purged of catalyst.

This application is a continuation-in-part of my earlier filed co-pending application, Serial No. 478,824, filed December 30, 1954, now abandoned.

It will be understood that it is intended to cover all changes and modifications of the form of invention herein chosen for the purpose of illustration which do not constitute departures from the spirit and scope of the invention.

What I claim is:

1. A proportioning apparatus comprising two pumps, one of said pumps being a rotary pump, a reciprocating drive for the pumps, means for connecting the reciprocating drive to the drive mechanism of each of the two pumps which includes means adapted to drive the shaft of the rotary pump to deliver liquid when the reciprocating drive moves in one direction and to run free of the shaft when the reciprocating drive moves in the opposite direction and which also includes means for transmitting only a portion of the movement of the reciprocating drive for driving the other pump to deliver liquid when the said rotary pump shaft is being driven and to stop such delivery of liquid when the driving means for the rotary pump runs free of the rotary pump shaft whereby simultaneous pumping of proportionate quantities of liquid from each pump may be achieved in intermittent flow.

2. A structure as specified in claim 1 which includes means for adjusting the stroke of the reciprocating drive to change the amount of liquid delivered by the pumps without substantially changing the proportional relationship between the two liquids.

3. Apparatus for mixing two liquids and delivering the resulting mixture in simultaneous but intermittent flow comprising a mixing chamber, means for delivering two liquids in intermittent flow into the lower portion of said chamber, a generally U-shaped nozzle positioned at the top of said mixing chamber having its discharge point located above the level where the two liquids are delivered into the chamber whereby the two liquids may be mixed and the mixture delivered in intermittent flow with relatively sharp cutoff when the flow of liquid is interrupted.

4. A structure as specified in claim 3 which includes an agitator having a shaft rotatively mounted in the bottom of the chamber and means for driving the shaft from below the bottom of the agitator.

5. A proportioning apparatus comprising a rotary pump, a reciprocating type pump, a reciprocating drive that provides the power for running both pumps, means for connecting the reciprocating drive to the shaft of the rotary pump, said means being adapted to drive the shaft of the rotary pump when the reciprocating drive moves in one direction and to run free of the shaft when the reciprocating drive moves in a second direction, and means for connecting the reciprocating pump to the reciprocating drive so that simultaneous pumping of proportionate quantities of liquid from each pump may be achieved in intermittent flow.

6. A proportioning apparatus comprising a rotary pump and a reciprocating pump, ratchet means for driving the shaft of the rotary pump, a pivotal arm connected with said ratchet means, reciprocating means for pivoting the said arm through an angle α, said ratchet means being adapted to drive the shaft of the rotary pump so that a radial line on the shaft of the pump will move through an angle equal to the said angle α when the pivotal arm moves in one direction and said ratchet means being further adapted to run free of the shaft of the rotary pump when the pivotal arm moves in a second direction, and reciprocating means for connecting reciprocating pump to the pivotal arm whereby simultaneous pumping of proportionate quantities of two liquids in intermittent flow may be achieved.

7. A structure as specified in claim 6 which includes a mixing chamber, means for connecting the discharge end of the rotary and reciprocating pumps to the bottom of said mixing chamber, a nozzle positioned on the top of said mixing chamber having its discharge point located above the level where the rotary and piston pumps are connected to the said mixing chamber whereby the liquids delivered by the rotary and reciprocating pumps may be mixed and measured quantities of the mixture delivered from the said nozzle in intermittent flow.

8. The structure as specified in claim 6 which includes a single revolution clutch for driving the reciprocating means for pivoting the first mentioned pivotal arm and means for actuating said clutch.

9. A proportioning apparatus comprising a rotary pump, a reciprocating pump, reciprocating means that provides the power for running both pumps, which means is adapted to turn the shaft of the rotary pump at predetermined intervals of time to give intermittent pumping of liquid, means for connecting the reciprocating pump with said reciprocating means whereby simultaneous pumping of proportionate quantities of two liquids may be achieved.

10. A proportioning apparatus comprising a rotary pump, and a reciprocating type pump, a reciprocating drive, means including a pivotal arm for connecting the reciprocating drive to the shaft of the rotary pump, said means being adapted to drive the shaft of the rotary pump when the reciprocating drive moves in one direction and to run free of the shaft when the reciprocating drive moves in a second direction, a second pivotal arm, reciprocating means for connecting said second pivotal arm to said first pivotal arm and means for connecting the reciprocating pump to said second pivotal arm whereby simultaneous pumping of proportionate quantities of two liquids in intermitten flow may be achieved, a mixing chamber, means for connecting the discharge end of said rotary and reciprocating pumps to one end of said mixing chamber, means positioned within said mixing chamber for mixing the said liquids and a nozzle positioned on the second end of said mixing chamber for discharge of the liquid mixture.

11. A proportioning apparatus comprising a rotary pump and a reciprocating type pump, a reciprocating drive, a clutch member on the drive shaft of said rotary pump, a pivotal arm for connecting said clutch member to the reciprocating drive, said clutch member being adapted to drive the shaft of the rotary pump when the reciprocating drive moves in one direction and to run free of the shaft of the rotary pump when the reciprocating drive moves in a second direction, a second pivotal arm, reciprocating means for connecting said second pivotal arm to said first pivotal arm, means for connecting the reciprocating pump to said second pivotal arm, a mixing chamber, means for connecting the discharge end of said rotary and reciprocating pumps to the mixing chamber, means within said chamber for mixing two liquids delivered by said pumps whereby measured quantities of the liquid mixture may be delivered from the mixing chamber in intermittent flow.

12. A structure as specified in claim 11 in which the means for connecting the reciprocating pump to the second pivotal arm includes a third pivotal arm which has one end slidably mounted in the second pivotal arm.

13. A proportioning apparatus comprising a rotary pump, reciprocating driving means including a clutch member for driving the shaft of the rotary pump, so that a radial line on the shaft will move through an angle α each time the reciprocating driving means reciprocate, a second rotary pump, reciprocating means for connecting said second rotary pump to the said reciprocating drive including a clutch member for driving the shaft of the second rotary pump, said connecting means and clutch member being adapted to rotate a radial line on the shaft of the second rotary pump through an angle which is different in size from that of the said angle α each time the reciprocating driving means reciprocate whereby simultaneous pumping of proportionate quantities of liquid may be delivered by each pump in intermittent flow.

14. A structure as specified in claim 1 which includes a mixing chamber, means for connecting the discharge end of both of said pumps to the bottom of said mixing chamber, a nozzle positioned on top of said mixing chamber having its discharge point located above the level where the rotary and piston pumps are connected to the said mixing chamber, whereby the liquids delivered by the two pumps may be measured quantities of the mixture delivered from the said nozzle in intermittent flow.

15. A structure as specified in claim 13 which includes a mixing chamber, means for connecting the discharge end of both of said pumps to the bottom of said mixing chamber, a nozzle positioned on top of said mixing chamber having its discharge point located above the level where the rotary and piston pumps are connected to the said mixing chamber, whereby the liquids delivered by the two pumps may be mixed and measured quantities of the mixture delivered from the said nozzle in intermittent flow.

16. A proportioning apparatus comprising a rotary pump, a reciprocating drive that supplies the power for running both pumps, a clutch member on the drive-shaft of said rotary pump, a pivotal arm for connecting said clutch member to the reciprocating drive, said clutch member being adapted to drive the shaft of the rotary pump when the reciprocating drive moves in one direction and to run free of the shaft of the rotary pump when the reciprocating drive moves in a second direction, a second rotary pump, a second clutch member connected to the shaft of said second rotary pump, a second pivotal arm connected to the said second clutch member, means for connecting said two pivotal arms, said second clutch member being adapted to drive the shaft of the second rotary pump when the reciprocating drive moves in one direction and to run free of the shaft when the reciprocating drive moves in a second direction, a mixing chamber, means for connecting the discharge end of said two pumps to the mixing chamber, means within said chamber for mixing liquids whereby measured quantities of liquid may be delivered from the mixing chamber in intermittent flow.

17. A structure as specified in claim 16 in which the means for connecting the two pivotal arms include a third pivotal arm and a rod connecting the second pivotal arm to said third pivotal arm, said connecting rod being slidably mounted on said third pivotal arm so that the location of the connecting rod on the third pivotal arm may be changed to change the ratio between the quantities of liquid delivered by the said two pumps.

18. A structure as specified in claim 16 in which the mixing chamber has a nozzle with its delivery point located above the level where the discharge ends of said two pumps are connected to the mixing chamber whereby a sharp cutoff of liquid is achieved when the flow is interrupted.

19. In an overrunning clutch of the type which includes a housing rotatively mounted on a driven member which has triangular notches with steel rollers positioned therein which are adapted to connect the driven member to the housing when the rollers are in the apex of the triangular notches to engage the clutch and which when moved into the base of the triangular notches lose contact with the housing to disengage the clutch and which includes springs which at all times tend to urge the said rollers into the apex of the triangular notches to engage the housing and driven member a device for disengaging the housing from the driven member which comprises disengaging plate rotatively mounted in the housing next to said driven member which has a plurality of pins each of which is positioned in a triangular notch between the steel roller and apex of said notches, said clutch disengaging plate having a plurality of holes positioned therein, a steel ball in each of said holes which is small enough to move through the holes, a plurality of cam grooves positioned in the face of the driven member adapted to receive the steel balls of the disengaging plate, means for applying pressure against the balls of the disengaging plate to force said balls down into the wedge-shaped cam grooves of the driven member whereby when the balls are forced into the camming grooves the disengaging plate will be forced to rotate in a direction opposite to the direction of rotation of the said clutch plate and whereby the pins of the clutch disengaging plate will force the balls of the clutch plate into the base of the wedge-shaped notches and disengage the clutch from the housing.

20. A proportioning apparatus comprising a rotary pump, reciprocating driving means including a clutch member for driving the shaft of the rotary pump, a second rotary pump, means for connecting said second rotary pump to the said reciprocating drive including a second clutch member for driving the shaft of the second rotary pump, said driving and connecting means being adapted to drive the shaft of both of said rotary pumps to deliver liquid when the reciprocating drive moves in one direction and to run free of the shaft to stop delivery of liquid from both pumps when the reciprocating drive moves in the opposite direction whereby simultaneous pumping of proportionate quantities of liquid from each pump may be achieved in intermittent flow, said second clutch member comprising a housing rotatively mounted on a driven member which has triangular notches with steel rollers positioned therein which rollers are adapted to connect the driven member to the housing when the rollers are in the apex of the triangular notches to engage the clutch and which when moved into the base of the triangular notches lose contact with the housing to disengage the clutch and which includes springs which at all times tend to urge the said rollers into the apex of the triangular notches to engage the housing and driven member, a device for disengaging the housing from the driven member which comprises a disengaging plate rotatively mounted in the housing next to said driven member which plate has a plurality of pins each of which is positioned in a triangular notch between the steel roller and apex of said notches, said clutch disengaging plate having a plurality of holes positioned therein, a steel ball in each of said holes which is small enough to move through the holes, a plurality of cam grooves positioned in the face of the driven member adapted to receive the steel balls of the disengaging plate, means for applying pressure against the balls of the disengaging plate to force said balls down into the wedge-shaped cam grooves of the driven member whereby when the balls are forced into the camming grooves the disengaging plate will be forced to rotate in a direction opposite to the direction of rotation of the said clutch plate and whereby the pins of the clutch disengaging plate will force the balls of the clutch plate into the base of the wedge-shaped notches and disengage the clutch from the housing.

21. A proportioning apparatus comprising two pumps, one of said pumps being a rotary pump, a reciprocating drive for the pumps, means for connecting the reciprocating drive to the drive mechanism of each of the two pumps which includes means adapted to drive the shaft of the rotary pump to deliver liquid when the reciprocating drive moves in one direction and to run free of the shaft when the reciprocating drive moves in the opposite direction and which also includes means for transmitting only a portion of the movement of the reciprocating drive for driving the other pump to deliver liquid when the reciprocating drive moves in either direction whereby pumping of proportionate quantities of liquid from the pumps may be achieved in intermittent flow.

References Cited in the file of this patent

UNITED STATES PATENTS

| | | |
|---|---|---|
| 861,366 | Jahn | July 30, 1907 |
| 879,016 | Starr | Feb. 11, 1908 |
| 1,023,411 | Behrmann | Apr. 26, 1912 |
| 1,051,171 | Stevenson | Jan. 21, 1913 |
| 1,907,731 | Brown | May 9, 1933 |
| 1,964,028 | Boynton et al. | June 26, 1934 |
| 1,997,370 | Le Vesconte | Apr. 9, 1935 |
| 2,036,810 | Hurrell | Apr. 7, 1936 |
| 2,224,797 | Pinder | Dec. 10, 1940 |
| 2,312,111 | McKinnis | Feb. 23, 1943 |
| 2,354,634 | Griswold | July 25, 1944 |
| 2,627,453 | Sheen | Feb. 3, 1953 |
| 2,737,978 | Eberz | Mar. 13, 1956 |